US012743600B2

(12) United States Patent
Visuttisen et al.

(10) Patent No.: US 12,743,600 B2
(45) Date of Patent: Sep. 22, 2026

(54) SYSTEM TO INCREASE COMMUNICATION RANGE OF RADIO FREQUENCY IDENTIFICATION (RFID) TAG

(71) Applicant: Silicon Craft Technology Public Company Limited (SICT), Bangkok (TH)

(72) Inventors: Siriwan Visuttisen, Bangkok (TH); Noparooj Tungcharoen, Bangkok (TH); Sitthipong Wongnamkum, Bangkok (TH)

(73) Assignee: Silicon Craft Technology Public Company Limited (SICT), Bangkok (TH)

( * ) Notice: Subject to any disclaimer, the term of this patent is extended or adjusted under 35 U.S.C. 154(b) by 43 days.

(21) Appl. No.: 18/510,245

(22) Filed: Nov. 15, 2023

(65) Prior Publication Data

US 2025/0156672 A1 May 15, 2025

(51) Int. Cl.
*G06K 19/07* (2006.01)

(52) U.S. Cl.
CPC ..... *G06K 19/0726* (2013.01); *G06K 19/0723* (2013.01)

(58) Field of Classification Search
CPC ............... G06K 19/07; G06K 19/0723; G06K 19/0726; G06K 19/077; G06K 19/07773
USPC ...................... 235/492, 451; 340/572.1, 10.1
See application file for complete search history.

(56) References Cited

U.S. PATENT DOCUMENTS

| | | | | |
|---|---|---|---|---|
| 6,525,362 | B2 * | 2/2003 | Sadayuki | G06K 19/0713 235/487 |
| 7,397,872 | B2 | 7/2008 | Komori et al. | |
| 8,265,570 | B2 | 9/2012 | Koo et al. | |
| 8,472,560 | B2 | 6/2013 | Rezayee et al. | |
| 9,136,914 | B2 | 9/2015 | Von Novak et al. | |
| 10,886,782 | B2 | 1/2021 | Ettes | |
| 10,972,151 | B2 | 4/2021 | Smirnov | |
| 11,025,347 | B2 | 6/2021 | Zeng et al. | |
| 2015/0261984 | A1 * | 9/2015 | Cho | G06K 7/10237 235/439 |

* cited by examiner

*Primary Examiner* — Suezu Ellis
(74) *Attorney, Agent, or Firm* — Troutman Pepper Locke LLP

(57) ABSTRACT

A passive Radio Frequency Identification (RFID) tag with increased communication range is a novel passive RFID tag with increased communication range feature. The RFID tag includes antennas, RFID integrated circuit (RFID IC). The RFID IC includes various components such as resonant capacitor, front-ended circuit, digital controller and radio frequency (RF) signal strength detector. The method to increase communication range of RFID tags includes connecting RFID tags antenna to terminals of RFID IC, matching input RF signal, converting AC signal to DC signal, sensing current or voltage, comparing the output voltage, modulating and determining signal.

6 Claims, 3 Drawing Sheets

A

B

SYSTEM TO INCREASE COMMUNICATION RANGE OF RADIO FREQUENCY IDENTIFICATION (RFID) TAG

TECHNICAL FIELD OF THE INVENTION

The present invention relates to the field of radio frequency identification (RFID) technology, and particularly, to a passive Radio Frequency Identification (RFID) tag with increased communication range.

BACKGROUND OF THE INVENTION

Radio Frequency Identification (RFID) technology is widely used in various industries, it involves the use of radio waves to identify and track objects or people using tags that are attached to or implanted in them. The tags contain a small radio transponder and an antenna, which communicate with RFID readers or interrogators using electromagnetic waves. One of the major challenges of this technology is achieving a sufficient communication range for tags, especially in environments with high levels of interference or where tags are moving quickly. Conventional RFID systems typically have a limited communication range, which can be a significant limitation in certain applications, such as inventory management, asset tracking, and access control. The communication range of RFID tags is the maximum distance between the tags and the readers that allow the tags to be read. There are many factors that affect the communication range of the RFID tags. For example, the RFID tags communication range can be affected by various types of interference such as electromagnetic interference (EMI) from other electronic devices or metal objects in the vicinity of the tag. Other factors can be tag orientation, if the tag is not facing the RFID reader, the signal may not be strong enough to read the tag. Frequencies of radio waves can be a factor which affects the communication range of RFID tags. Higher frequencies generally result in shorter communication ranges. Temperature, humidity, and moisture can be the other important factors that affect the communication range of the RFID tags as well as tag size and material. Smaller tags generally have shorter communication ranges, while tags made of metal or other conductive materials can interfere with the signal and reduce the communication range of the RFID tags. RFID reader output power is also a significant factor which partly affects the communication range of the RFID tags. If the output power of the RFID reader is not sufficient, the RFID tags will have a shorter communication range.

To overcome these limitations, various techniques have been developed to increase the communication range of RFID tags. These techniques include using specialized antennas, signal amplifiers, and directional readers. However, these solutions have their own limitations, such as high cost, limited scalability, and complex set up.

The U.S. Pat. No. 9,136,914 B2 describes a method for detecting impedance changes in wireless power transmission. The method involves measuring the reflected power from a wireless power transmitter and analyzing it to determine if there are any changes in the impedance of the wireless power receiver. The reflected power is measured by sending a test signal from the transmitter and comparing it with the signal received back from the receiver. If there is a significant difference between the two signals, it indicates that there has been an impedance change in the receiver, which may be due to a change in the position or orientation of the receiver or the presence of an object between the transmitter and receiver. The patent also describes different embodiments of the method, including different techniques for analyzing the reflected power signals and algorithms for determining the location and orientation of the receiver based on the impedance changes. In summary, it increases the communication distance by using a boosting capacitor which requires a large additional area. Even though the communication distance has increased, RFID tags still need to be within a limited distance.

The U.S. Pat. No. 10,461,973 B2 describes a passive RFID sensor tag. The tag includes a sensor element, an RFID chip, and an antenna. The sensor element is configured to detect a physical or chemical parameter and generate a corresponding signal. The RFID chip is configured to receive the signal from the sensor element, modulate it, and transmit it to an RFID reader via the antenna. The patent also describes different embodiments of the tag, including designs for specific types of sensors and configurations for optimizing performance. It requires specific types of sensors in order to optimize the performance which is not convenient to use. In addition, there is no function for increasing communication range in the RFID tags.

To address these challenges, there is a need to develop passive RFID tags with a feature that can increase efficiency of the communication range between RFID readers and RFID tags. It should be designed to be low-cost, small area, easy to set up and minimize the complexity of circuits, while providing a significant improvement in the communication range of RFID tags.

SUMMARY OF THE INVENTION

The present invention describes herein generally relates to a passive Radio Frequency Identification (RFID) tag with increased communication range. The passive RFID tag includes antennas, RFID integrated circuit (RFID IC). The RFID IC includes various components such as a resonant capacitor, a front-ended circuit, a digital controller and a radio frequency (RF) signal strength detector. The method for increasing the communication range of RFID tags includes connecting the antenna to terminals of RFID IC, matching input RF signal, converting AC signal to DC signal, sensing current or voltage, comparing the output current or voltage, modulating and determining the comparator signal with modulation signal pattern, and transmitting the modulation signal to the RFID readers.

The general purpose of our invention is to create passive RFID tags with a feature that can increase the communication range of passive RFID tags while minimizing the additional circuit area in the RFID IC. The RFID tag requires fewer components and less circuit complexity, resulting in a low-cost and easy-to-set-up system.

DETAILED DESCRIPTION OF THE INVENTION

Figure 1:
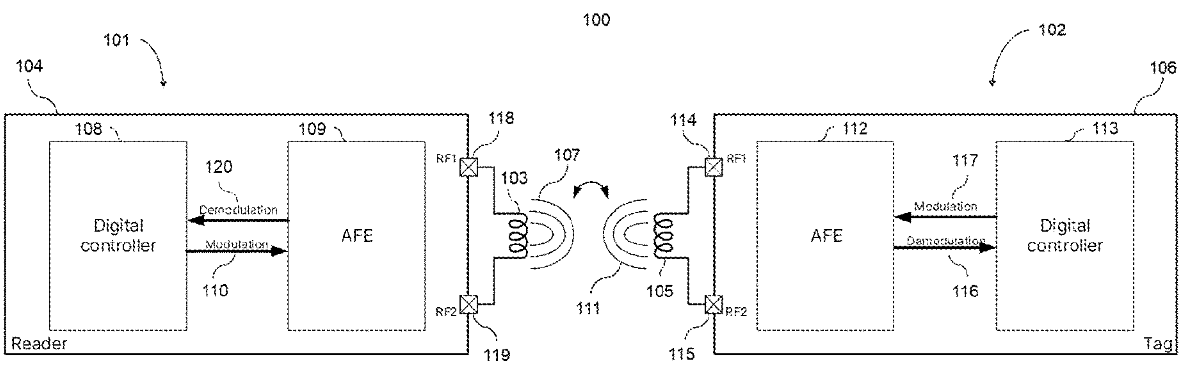
FIG. 1. is a simplified diagram of an RFID system.

FIG. 1. shows a simplified diagram of an RFID system 100, which typically comprises an RFID reader 101 and an RFID tag 102. The RFID reader 101 typically comprises an antenna 103 and an integrated circuit (IC) 104. The RFID tag 102 typically comprises an antenna 105 and an integrated circuit (IC) 106. The RFID reader 101 transmits an alternating current (AC) RF signal 107 via an antenna 103 to deliver power and communication commands to the RFID tag 102. The communication commands are data which is sent from a digital controller 108 to an analog front end (AFE) 109 via modulation signal 110. The RFID tag 102 receives the transmitted RF signal 107 via an antenna 105. Upon receiving sufficient power, the RFID tag 102 responds to the commands sent from the RFID reader 101 and then transmits the requested data back to the RFID reader 101 by reflecting the RF signal 111.

The IC 106 of the RFID tag 102 typically comprises an analog front end (AFE) 112 and a digital controller 113. The antenna 105 will send the received RF signal 107 to an analog front end (AFE) 112 via RF terminals 114 and 115. The AFE 112 converts and demodulates the received RF signal 107 into a direct current (DC) voltage and a demodulated signal 116, respectively. The DC voltage and the demodulated signal 116 are sent to a digital controller 113. The DC voltage is used to power the digital controller 113. The digital controller 113 retrieves the commands transmitted from the RFID reader 101 by processing the demodulated signal 116. Depending on the received commands, the digital controller 113 may send data via a modulation signal 117 to the AFE 112. Depending on the modulation signal 117, the AFE 112 may modulate the RF signal 107 with the modulation signal 117 and send the modulated RF signal 111 back to the RFID reader 101 via the antenna 105. The RFID reader 101 receives the modulated RF signal 111 via the antenna 103 and sends the modulated RF signal 111 to the analog front end (AFE) 109 via RF terminals 118 and 119. The AFE 109 demodulates the received modulated RF signal 111 and provides a demodulated output signal 120 to the digital controller 108. The digital controller 108 processes the received demodulated signal 120 to extract the transmitted data from the RFID tag 102.

Figure 2:
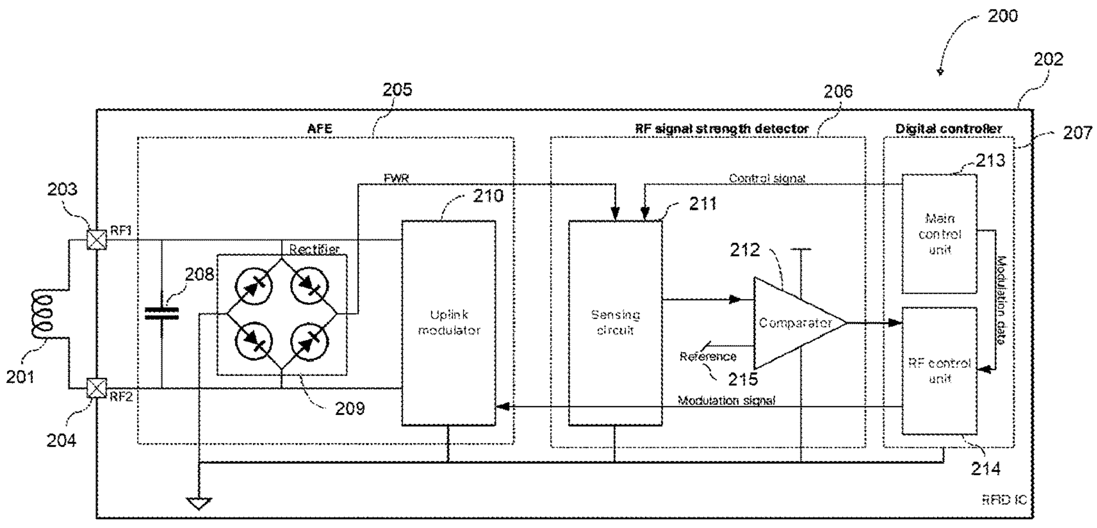
FIG. 2. is a simplified block diagram of passive RFID tag according to the present invention.

FIG. 2. shows a simplified block diagram of the passive RFID tag 200 according to the present invention. The passive RFID tag 200 comprises an antenna 201 and a RFID IC 202. The RFID IC 202 comprises two RF terminals, a first RF terminal 203 and a second RF terminal 204, a front-end circuit (AFE) 205, a radio frequency signal strength detector (RF signal strength detector) 206, and a digital controller 207. The AFE 205 comprises a resonant capacitor 208, a rectifier 209 and an uplink modulator 210. The RF signal strength detector 206 comprises a sensing circuit 211 and a comparator 212. The digital controller 207 comprises a main control unit 213 and a radio frequency control unit (RF control unit) 214.

In the RFID tag 200, the antenna 201 is coupled to the first RF terminal 203 and the second RF terminal 204. The antenna 201 is configured to receive an RF signal, which is wirelessly transmitted from a RFID reader 101 and provides the received RF signal to the first RF terminal 203 and the second RF terminal 204. The received RF signal is sent to the resonant capacitor 208, which is coupled to the AFE 205. The resonant capacitor 208 together with the antenna 201 form a resonant network, which has a resonant frequency determined by the capacitance of the resonant capacitor 208 and the inductance of the antenna 201. To obtain a maximum operating range of the RFID tag 200, the resonant frequency of the resonant network is generally required to be equal to the carrier frequency of the received RF signal. The resonant capacitor 208 is usually configured to tune the resonant frequency of the resonant network to match the carrier frequency of the received RF signal. The received RF signal from the resonant capacitor 208 is sent to the rectifier 209, where it is converted from an alternating current (AC) signal to a direct current (DC) signal by using the full-wave rectification (FWR). The resulting signal is then sent to the sensing circuit 211. While the DC signal wakes up the main control unit 213, the modulation state is generated within the unit. Then the main control unit 213 will send a control signal and a modulation data to the sensing circuit 211 and the RF control unit 214, respectively. The control signal can command the sensing circuit 211 to start sensing or measuring the DC signal to indicate the strength of the RF signal. After the sensing circuit 211 has received the control signal from the main control unit 213, the sensing circuit 211 will sense or measure the DC signal and then provides the said DC signal to the comparator 212. The comparator 212 compares the said DC signal with a reference level 215 and provides a comparator output signal. The reference level 215 can be either a reference voltage or a reference current. At the same time, the RF control unit 214 received the comparator output signal from the comparator 212, and the modulation data from the main control unit 213. Then the RF control signal 214 provides a modulation signal to the uplink modulator 210. The RF control unit 214 will determine the modulation pattern of the modulation signal to adjust duty cycle of the system. The modulation signal will be sent to the uplink modulator 210 to modulate the received RF signal, resulting in a modified RF signal. Then the uplink modulator 210 will transmit the modified RF signal to the antenna 201 to the RFID reader 101.

Figure 3:
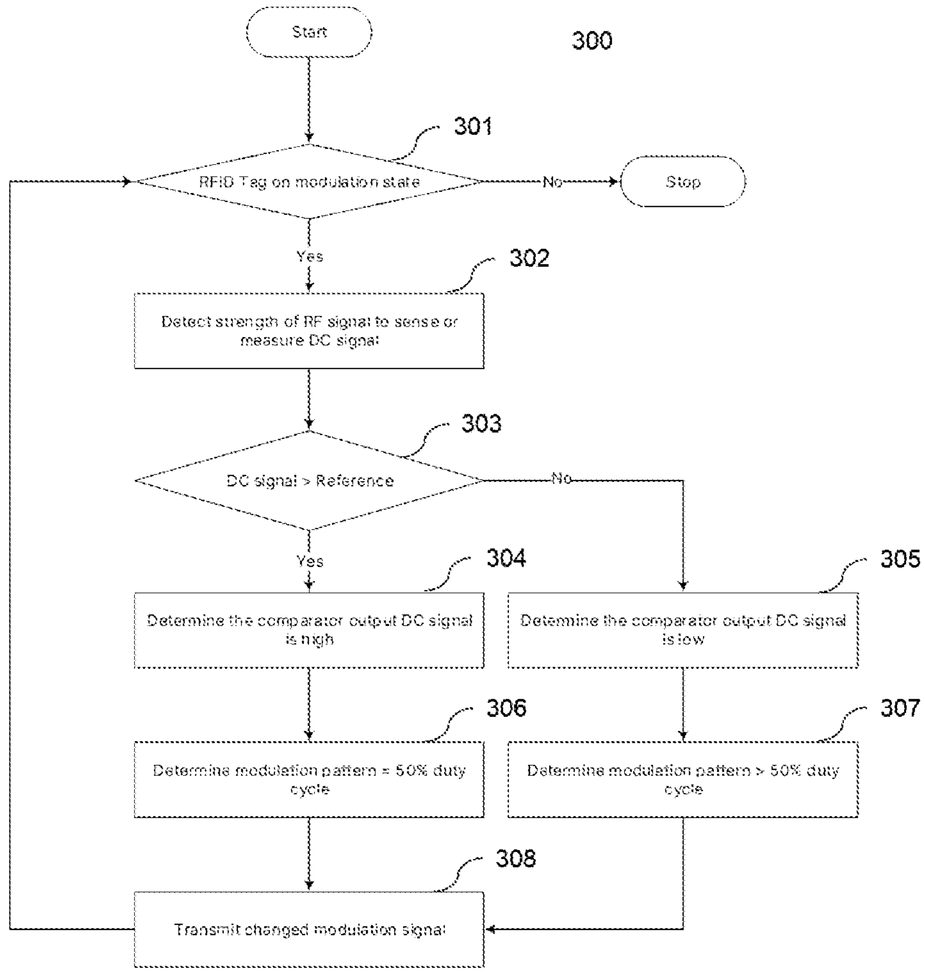
FIG. 3. is a flow chart of the method for increasing the communication range of RFID tag according to the present invention.

FIG. 3. shows a flow chart of the method for increasing the communication range of RFID tag 300 according to the present invention. The method for increasing the communication range of RFID tag 300 starts with the first step of checking the modulation state 301 in the main control unit 213. The RFID tag 200 will be in the modulation state when a state machine changes its status into the modulation state. The state machine is a control mechanism or logic that governs the behavior and transitions of the RFID tag 200 based on different events and inputs. It is a conceptual model used to describe the various states or operational modes of the RFID tag 200. Furthermore, the modulation state can also occur when the RFID tag 200 receives a command in a form of the RF signal from the RFID reader 101 and needs to transmit data back to the RFID reader 101, causing it to enter the modulation state. If the RFID tag 200 is not in the modulation state, the method for increasing the communication range of RFID tag 300 will stop. If the RFID tag 200 is in the modulation state, the method for increasing the communication range of RFID tag 300 will enter the second step 302 of detecting strength of RF signal. In the second step 302, the sensing circuit 211 will detect the strength of RF signal to indicate the strength of RF signal by sensing or measuring the DC signal, which is derived from the rectifier 209, and then provides the said DC signal to the comparator 212. Next, in the third step 303, the comparator 212 will compare the DC signal with the reference level 215 under the following conditions and steps:

If the DC signal from sensing circuit 211 is higher than the reference level 215, the comparator output signal will be high in the step of determining the comparator output signal 304;

When the comparator output signal is high, the amplitude of comparator output signal may be equal to the power supply voltage, the RF control unit 214 will determine the modulation pattern of the modulation signal to have a duty cycle of 50% in the step of determining the duty cycle of a modulation data 306; and The RF control unit 214 will send the modulation signal to the uplink modulator 210 in the step of sending the modulation signal 308;

If the DC signal from sensing circuit 211 is equal to or lower than the reference level 215, the comparator output signal will be low in the step of a determining the comparator output signal 305;

When the comparator output signal is low, the amplitude of comparator output signal may be equal to zero voltage, the RF control unit 214 will determine the modulation pattern of the modulation signal to have a duty cycle larger than 50% in the step of determining the duty cycle of a modulation data 307; and The RF control unit 214 will send the modulation signal to the uplink modulator 210 in the step of sending the modulation signal 308.

The method for increasing the communication range of RFID tag 300 will automatically repeat the operation in the steps 301 to 308 until the RFID tag 200 is not in the modulation state.

Figure 4:
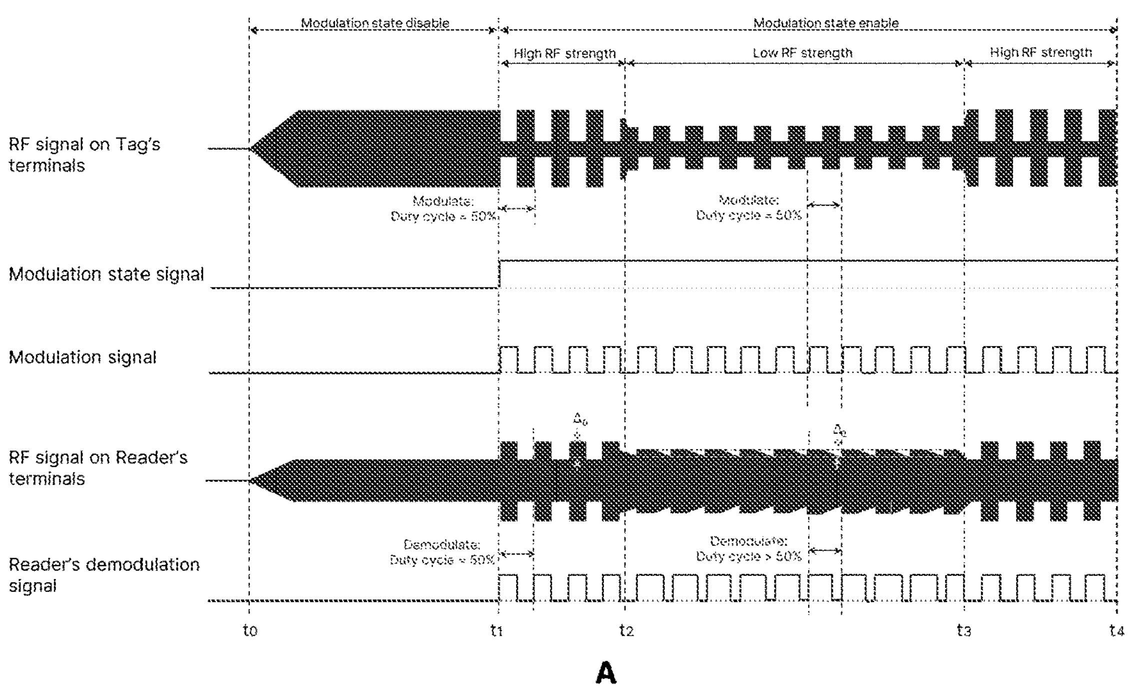
FIG. 4. is an example of a state diagram illustrating signal results of the RFID tag after the finished operation according to the present invention.
Figure 4:
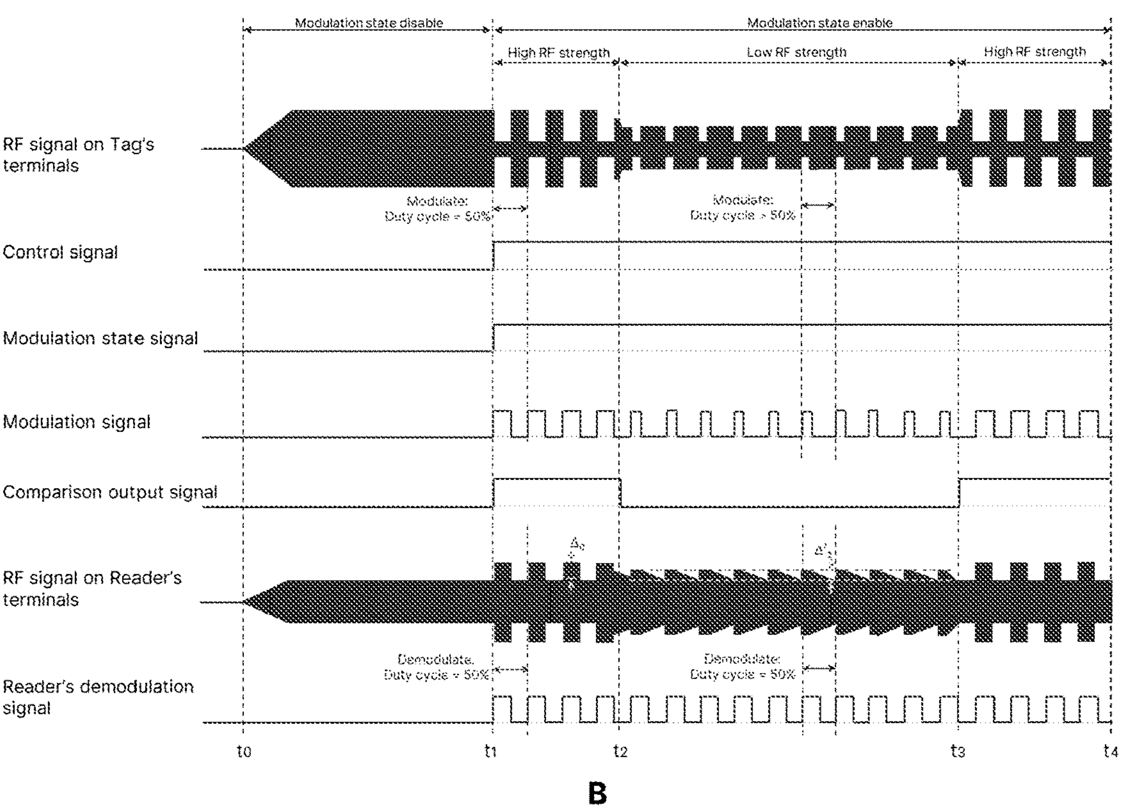

FIG. 4. shows an example diagram of voltage waveforms of RFID tag and RF reader of the prior art (FIG. 4A) and the present invention (FIG. 4B). The figures display various voltage waveforms (in V) plotted against time (in ms). In FIGS. 4A and 4B, during the time t0 to t1, the RFID tag 102 and the RFID tag 200 are not in modulation state, hence, the RFID tag's modulation state signal is low, and the RF voltage signals at both RFID tag 101 and RFID tag 200 and RFID reader terminals have constant amplitudes (i.e. no modulation). The RFID reader 101 receives data from the RFID tag 102 and the RFID tag 200 via the RFID reader's demodulation signal. At this period, the RFID reader's demodulation signal is low. In addition, in FIG. 4B, during the same time interval, there are two additional signals: the control signal and the comparison output signal, both of which are low voltages.

During t1 to t2 in FIG. 4A, the RFID tag's modulation state signal is high and the RF signal strength at the tag terminal is high. The RFID tag 102 will be in the modulation state, the modulation signal will be changed to be a square waveform with 50% duty cycle. The result of changing, the RF signal at the RFID tag terminal is amplitude modulated with 50% duty cycle. The envelope of the RFID tag RF signal is a square waveform in accordance with the transmitted digital data. At the RFID reader terminal, the received RF signal will be amplitude modulated with 50% duty cycle and the envelope of the received RF signal is a square waveform in accordance with the received digital data. The amplitude of the envelope, which is the voltage difference between the high and low amplitude levels, is equal to $\Delta_0$. The RFID reader's RF signal will be demodulated by a demodulator, whose output signal, which is a demodulation signal, has a square waveform in accordance with the received digital data. The square waveform is 50% duty cycle.

During t1 to t2 in FIG. 4B, the RFID tag's modulation state and control signals are high and the RF signal strength at the RFID tag terminal is high. The RFID tag 200 will be in the modulation state, the modulation signal will be changed to be a square waveform with 50% duty cycle. The result of changing, the RF signal at the RFID tag terminal is amplitude modulated with 50% duty cycle. Since the RF signal strength is high, the comparator output signal will be high, and the modulation signal will have a duty cycle of 50%. The envelope of the RFID tag RF signal is a square waveform in accordance with the transmitted digital data. At the RFID reader terminal, the received RF signal will be amplitude modulated with 50% duty cycle and the envelope of the received RF signal is a square waveform in accordance with the received digital data. The amplitude of the envelope, which is the voltage difference between the high and low amplitude levels, is equal to $\Delta_0$. The RFID reader's RF signal will be demodulated by a demodulator, whose output signal, which is a demodulation signal, has a square waveform in accordance with the received digital data. The square waveform is 50% duty cycle.

During t2 to t3 in FIG. 4A, the RF signal strength at the RFID tag terminal is low and the modulation state signal is high. The RFID tag 102 will be in the modulation state, the modulation signal will be a square waveform with 50% duty cycle. The RF signal at the RFID tag terminal is amplitude modulated with 50% duty cycle. The envelope of the RFID tag's RF signal is a square waveform in accordance with the transmitted digital data. In this case, since the RF signal strength is low, the envelope of the received RF signal at the RFID reader 101 will not be a square waveform. Therefore, the RFID reader demodulation signal will be a square waveform with a duty cycle of more than 50%, which is not in accordance with the transmitted data from the RFID tag 102.

During the time intervals from t1 to t2 and t3 to t4 in both FIG. 4A and FIG. 4B, when the RFID tag 102 and the RFID tag 200 need to transmit data to the RFID reader, modulation is automatically enabled, and the RFID tag 102 and the RFID tag 200 enter the modulation state. After entering the modulation state, if the RF signal from the RFID tag 102 and the RFID tag 200 have high strength, it is modulated to have a 50% duty cycle. Simultaneously, the RFID reader 101 receives the modulated RF signal with a modulated voltage level ($\Delta_0$) from the RFID tag 102 and the RFID tag 200. The RFID reader 101 then demodulates this signal, resulting in a demodulation signal with a 50% duty cycle pulse voltage. However, in FIG. 4B, both the control signal and the comparison signal are high voltages.

During the time interval from t2 to t3, the modulation pattern in both FIG. 4A and FIG. 4B of the RFID tag 102 and the RFID tag 200 differs. In the low RF strength stage, the modulation signal in FIG. 4A continuously modulates with 50% duty cycle, as resulting on the RF signal has the duty cycle equal to 50%. In contrast, the duty cycle of the modulation signal in FIG. 4B is determined to be a pattern which gives the duty cycle of the RF signal greater than 50%. To determine a duty cycle greater than 50%, the sensing circuit 211 detects the strength of the RF signal to indicate the strength of RF signal by sensing or measuring the DC signal derived from the rectifier 209. The DC signal is then provided to the comparator 212 to compare it with the reference level 215. As a result, the comparison output signal is low, and the RF control unit 214 determines the modulation pattern on the RF signal with a duty cycle larger than 50%.

Simultaneously, the modulated RF signal and a first modulated voltage level ($\Delta_1$) and a second modulated voltage level ($\Delta'_1$) received by the RFID reader 101 in FIG. 4A and FIG. 4B also differ. In FIG. 4A, the RFID reader 101 receives the modulated RF signal with the first modulated voltage level ($\Delta_1$) lower than the second modulated voltage level ($\Delta'_1$) in FIG. 4B. The lower strength of this signal makes demodulation challenging and results in a duty cycle larger than 50% on the reader's demodulation signal, leading to miscommunication and a decreased communication range between the RFID reader 101 and the RFID tag 102.

Conversely, in FIG. 4B, the RFID reader 101 receives the modulated RF signal with the second modulated voltage level ($\Delta'_1$) higher than the first modulated voltage level ($\Delta_1$) in FIG. 4A. The higher strength of this signal facilitates easier demodulation and results in a duty cycle equal to 50% on the RFID reader's demodulation signal, thereby increasing the communication range between the RFID reader 101 and the RFID tag 200.

What is claimed is:

1. A passive Radio Frequency Identification (RFID) tag with increased communication range comprising:

a first Radio Frequency (RF) terminal;

a second Radio Frequency (RF) terminal;

an antenna configured to receive a Radio Frequency (RF) signal, transmitted wirelessly from a Radio Frequency Identification (RFID) reader and provide the received RF signal to the first RF terminal and the second RF terminal;

a Radio Frequency Identification Integrated Circuit (RFID IC) connected to the antenna, the RFID IC comprising:

a front-end circuit (AFE) configured to convert the received RF signal to a Direct Current (DC) signal to power the RFID IC, and to modulate the received RF signal for communication between the RFID reader and the RFID tag, the AFE comprising:

a resonant capacitor coupled to the antenna and configured to tune the antenna to receive the RF signal, a rectifier coupled to the first RF terminal and the second RF terminal, and configured to convert the received RF signal to the DC signal, and an uplink modulator coupled to the first RF terminal and the second RF terminal, and configured to modulate the received RF signal with a modulation signal;

a RF signal strength detector coupled to the rectifier and configured to detect strength of the RF signal, the RF signal strength detector comprising:

a sensing circuit configured to receive the DC signal from the rectifier and generate an output signal indicative of the strength of the RF signal, and a comparator configured to receive the output signal from the sensing circuit and compare magnitude level of the output signal with a reference level to generate a comparator output signal to the RF control unit;

a digital controller, wherein the digital controller comprising:

a main control unit configured to provide a modulation data, and a RF control unit configured to receive the modulation data from the main control unit and provide the modulation signal to the uplink modulator, wherein the digital controller configured to:

provide a control signal to control operation of the sensing circuit, determine a modulation pattern of the modulation signal by the RF control unit in response to the comparator output signal:

when the comparator output signal is high, the modulation pattern of the modulation signal has a duty cycle of 50%, and when the comparator output signal is low, the modulation pattern of the modulation signal has a duty cycle of larger than 50%.

2. The passive RFID tag of claim 1, wherein the reference level is a reference voltage.

3. The passive RFID tag of claim 1, wherein the reference level is a reference current.

4. The passive RFID tag of claim 1, wherein the comparator output signal is high when the output signal from the sensing circuit is higher than the reference level, the comparator output signal is low when the output signal from the sensing circuit is equal to the reference level, and the comparator output signal is low when the output signal from the sensing circuit is lower than the reference level.

5. The passive RFID tag of claim 4, wherein the reference level is a reference voltage.

6. The passive RFID tag of claim 4, wherein the reference level is a reference current.

* * * * *